(No Model.)
H. F. BODE.
SPECTACLE FRAME.
No. 435,961. Patented Sept. 9, 1890.
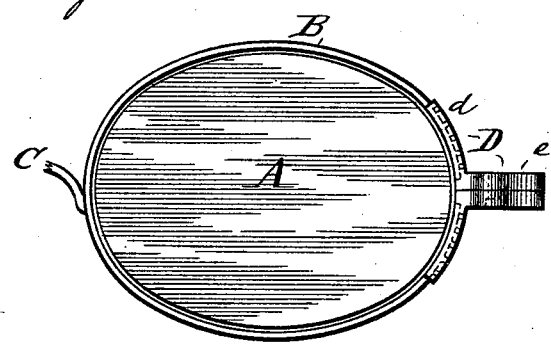
Fig. 1
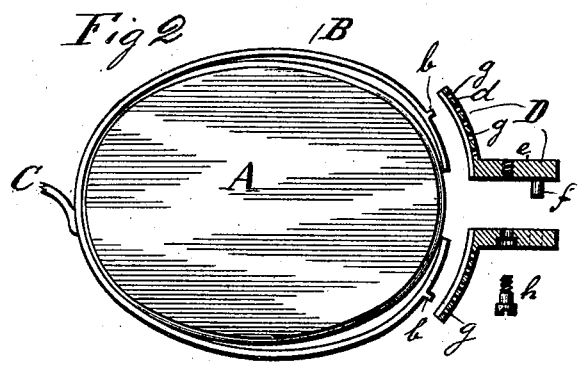
Fig. 2
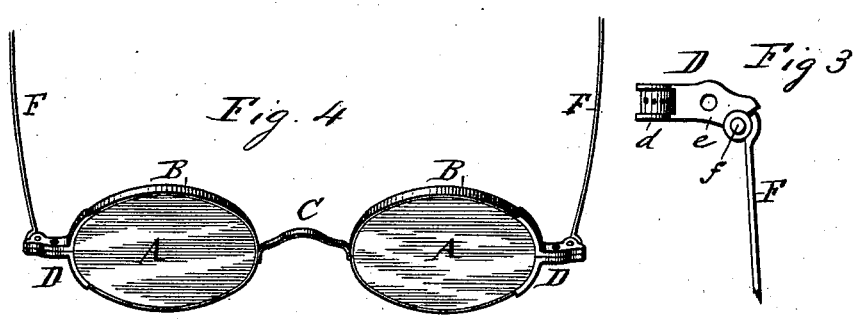
Fig. 3
Fig. 4
Witnesses
Otto Fubkert
Jens A. Johnson
Inventor
Henry F. Bode
By Wm. B. Lotz
Attorney
THE NORRIS PETERS CO., PHOTO-LITHO., WASHINGTON, D. C.

UNITED STATES PATENT OFFICE.

HENRY F. BODE, OF CHICAGO, ILLINOIS.

SPECTACLE-FRAME.

SPECIFICATION forming part of Letters Patent No. 435,961, dated September 9, 1890.

Application filed June 20, 1889. Renewed March 24, 1890. Serial No. 345,009. (No model.)

*To all whom it may concern:*

Be it known that I, HENRY F. BODE, a citizen of the United States of America, residing at Chicago, in the county of Cook and State of Illinois, have invented certain new and useful Improvements in Spectacle-Frames, of which the following is a specification, reference being had therein to the accompanying drawings.

This invention relates to spectacle-frames, the eyes or bows of which can be adjusted to hold lenses of different size, and it has been my object to provide a device by which such adjustment can be more readily accomplished; and with these objects in view my invention consists of the novel devices and combinations of devices hereinafter described, and specifically claimed.

In the accompanying drawings, Figure 1 represents an elevation of one of the eyes with the lens secured therein; Fig. 2, an elevation of the same before connecting the parts; Fig. 3, an edge view of one of the angle-pieces providing the clamps and temple-bar holder, and Fig. 4 is a perspective view of the spectacles complete and ready for use.

Corresponding letters of reference in the several figures of the drawings designate like parts.

A denotes the lens, and B the eye or bow for holding the lens, both these eyes or bows being connected by the bridge C in the usual manner. The eyes or bows B are open in their outward ends, and each such end is provided with a small stud *b* to enter and engage any one of a series of small holes *g* in shank *d* of angular piece D, the other shanks *e* of the two opposing angular pieces D providing the pivotal connection for one of the temple-bars F by one such shank *e*, having a stud *f*, entering a hole in the other shank *e* and passing through the pivot eye of such temple-bar F. The shanks *d* of angular pieces D are curved and grooved snugly to fit upon the end of bow B, and the holes *g* are drilled through these shanks *d* in the center line of the groove thereof, that with either hole *g* engaging stud *b*, and with the two shanks *e* of the opposing angular pieces D being drawn together by a screw *h*, passed through a countersunk hole in one shank *e*, and tapped into the other shank *e*, the bow B will be contracted around the lens. The stud *b* may be engaged with any one of the several holes *g*, as may be necessary for the size of the lens A, and these studs projecting radially will be on relative flaring positions that will secure the angular pieces D, to be rigid after being connected by screw *h*.

A spectacle-frame thus constructed is readily adjustable to accommodate different-sized lenses without indicating by its outer appearance any such adjusting device with the use of such spectacles.

The device, as will be readily seen, is very simple in its construction and cannot easily get out of order.

What I claim is—

1. The bow ends of a spectacle-frame provided with studs and the angular pieces providing the pivots for the temple-bars detachably secured by providing one shank of each with a groove and a series of holes, either one to engage the stud of a bow end, and by a screw contracting the opposing angular pieces for holding a lens of various size, substantially as set forth.

2. In a spectacle-frame, the bow B for holding lens A, provided near each end with a stud *b*, and in combination therewith the angular pieces D, each having one shank *d*, grooved and perforated with holes *g*, and another shank *e*, tapped for screw *h*, and provided with stud *f* for coupling temple-bar F, all substantially as set forth, for the purpose specified.

In testimony whereof I affix my signature in presence of two witnesses.

HENRY F. BODE.

Witnesses:
   WM. H. LOTZ,
   OTTO LUBKERT.